(12) United States Patent
Blidberg et al.

(10) Patent No.: US 7,206,211 B2
(45) Date of Patent: Apr. 17, 2007

(54) CONVERTER AND A METHOD FOR CONTROLLING A CONVERTER

(75) Inventors: Ingemar Blidberg, Ludvika (SE); Kjell Svensson, Ludvika (SE); Roland Siljeström, Grängesberg (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/531,103

(22) PCT Filed: Oct. 7, 2003

(86) PCT No.: PCT/SE03/01556

§ 371 (c)(1),
(2), (4) Date: Oct. 13, 2005

(87) PCT Pub. No.: WO2004/034559

PCT Pub. Date: Apr. 22, 2004

(65) Prior Publication Data

US 2006/0056209 A1    Mar. 16, 2006

(30) Foreign Application Priority Data

Oct. 9, 2002    (SE) .................................. 0202974

(51) Int. Cl.
*H02M 7/5387* (2006.01)

(52) U.S. Cl. ........................................ 363/132; 363/17
(58) Field of Classification Search ................... 363/17, 363/132, 98, 127
See application file for complete search history.

(56) References Cited

U.S. PATENT DOCUMENTS

| 5,621,634 A | 4/1997 | Sato |
| 6,507,503 B2 * | 1/2003 | Norrga ........................ 363/17 |

FOREIGN PATENT DOCUMENTS

| EP | 0533158 A2 | 3/1993 |
| SE | 517427 C2 | 6/2002 |
| WO | WO 0231956 A1 | 4/2002 |

OTHER PUBLICATIONS

Tae-Jin Kim, Dae-Wook Kang, Yo-Han Lee and Don-Seok Hyun; The Analysis of Conduction and Switching Losses in Multi-Level Inverter System; Power Electronics Specialist Conference, 20C; 2001; IEEE 32nd Annual; pp. 1363-1368; vol. 3.

M. Marchesoni; High Performance Current Control Techniques for Applications to Multilevel High Power Voltage Source Inverters; Power Electronics Specialist Conference; 1989; 20th Annual IEEE; pp. 672-682.

* cited by examiner

*Primary Examiner*—Shawn Riley
(74) *Attorney, Agent, or Firm*—Venable LLP; Eric J. Franklin

(57) ABSTRACT

In a method for control of a converter for conversion of dc voltage into ac voltage or dc voltage and vice versa, in which an output of the converter may alternatively be connected to a positive pole, a negative pole or a center of a dc voltage side of the converter in the form of different so-called main states, there is carried out, when changing between main states via a so-called minor commutation loop, an extra sequence in the form of a delayed turn-on of semiconductor elements in one unit of the converter relative to semiconductor elements in another unit in a pair of units of the converter.

31 Claims, 3 Drawing Sheets

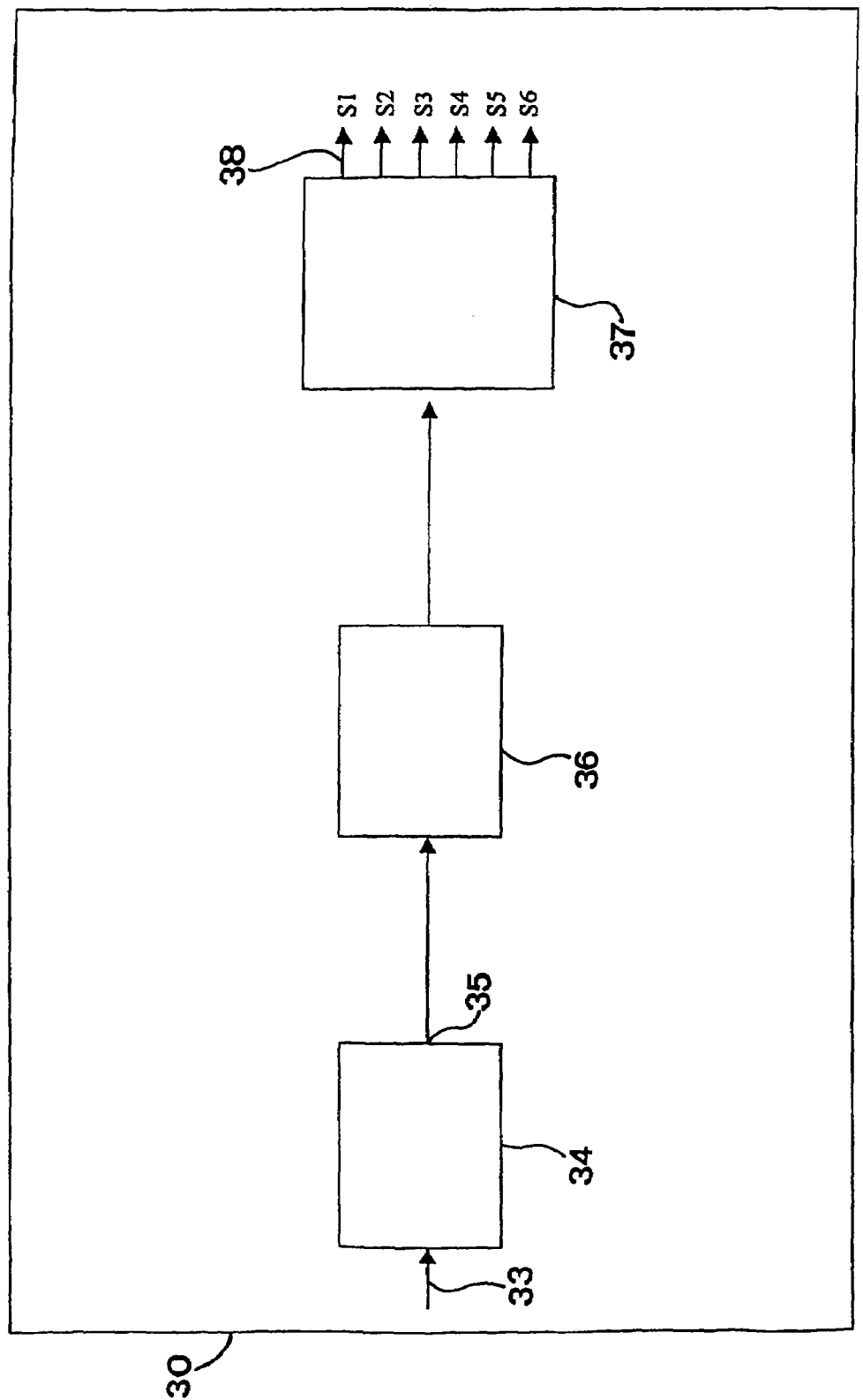

CONVERTER AND A METHOD FOR CONTROLLING A CONVERTER

FIELD OF THE INVENTION AND BACKGROUND ART

The present invention relates to a method for controlling a converter according to the preamble to the accompanying claim 1 and to a converter according to the preamble to the accompanying independent converter claim.

The invention thus relates to conversion of voltage in which at least one side of the converter carries a dc voltage, but the other side does not necessarily have to carry an ac voltage, but said output may also belong to a second side of a converter in the form of a dc/dc converter used for changing the level of a dc voltage. However, for the purpose of elucidating the invention, but consequently not limiting the same, the case of a converter with said output connected to an ac voltage line, that is, conversion between dc voltage and ac voltage, will henceforth be described. To this end, the case of a converter of VSC (Voltage Source Converter) type intended to generate a train of pulses, by switching between said main states, with a definite amplitude according to a pulse-width modulation pattern on the output of the converter will be described. Such a converter may be used in all situations where dc voltage is to be converted into ac voltage and vice versa, whereby examples of such uses are in stations of high-voltage direct current (HVDC) installations, in which the dc voltage is normally converted into three-phase ac voltage or vice versa, or in so-called back-to-back stations where ac voltage is first converted into dc voltage and this dc voltage then converted into ac voltage, as well as in SVCs (Static Var Compensators), where the dc-voltage side consists of one or more freely hanging capacitors. The ac side of the converter could also be connected to an ac motor for driving it, or to an ac generator.

Further, it is pointed out that the method is directed to control of a said converter that exhibits at least said six units, which means that at least three different levels may be obtained for the voltage on said output, but it is fully possible for the converter to exhibit several such units, so that more than four main states and also more than three levels of the voltage on the output may be achieved. In this context, several converters of this kind may form part of a converter for several phases, such as for three phases, but it may also be designed to form on its own a converter for conversion between dc voltage a single-phase ac voltage.

Further, the invention is not limited to any special voltage levels of said first dc voltage side or magnitude of power that is to be handled. The former is advantageously within the interval of 1 kV to 500 kV.

One advantage of using a converter with at least three levels instead of a two-level bridge when converting ac voltage to dc voltage is that considerably lower frequencies for switching the semiconductor elements of the units according to the pulse-width modulation pattern may be used for achieving a curve shape of the ac voltage side of a given quality. In this way, the switching losses may be considerably reduced so that it is also possible to transmit higher powers through such a three-level converter than through a two-level bridge, since higher on-state losses may be allowed. At the same time, harmonics generated by the pulse-width modulation process are reduced.

One method of the kind defined in the introductory part of the description is previously known from applicant's own Swedish patent 517 427. This Swedish patent describes a method that constitutes an improvement of prior art such methods for control of a converter with said six units by proposing how the switching losses are to be distributed more uniformly than previously between the different units. By utilizing, in an embodiment of the method according to Swedish patent 517 427, only four different states of the semiconductor elements of the units, the actual method for controlling the semiconductor elements will be very simple. It is pointed out that, in practice, there is, of course, a fifth possible state of this embodiment, namely when the converter is out of operation and when all the semiconductor elements are turned off. Since the semiconductor elements of the first and sixth units are controlled to assume the same position, turned on or off, in the respective main state, and since the semiconductor elements in the fourth and fifth units are controlled to assume the same position, turned on or off, in the respective main state, it is possible to use the same control signal for the semiconductor elements in the first and sixth units and in the fourth and fifth units, respectively.

Although it is advantageous to interlock, so to speak, the semiconductor elements in four of the units pair by pair in this way, the inventors of the present invention have realized that there may sometimes arise problems in giving the semiconductor elements of such a pair of units control signals for turning them on or off simultaneously. This is due to the fact that the semiconductor element will react differently to such a control signal in dependence on whether the semiconductor element is current-carrying during the switching or not, that is to say, whether it is a question of a passive voltage switching or an actual current commutation. A passive voltage switching may proceed considerably faster than an actual current commutation, so that in one case the semiconductor element is turned on or off significantly more rapidly than in the other case. Considering the condition of current direction during commutation, this may imply that brief high voltage peaks could be achieved across any said unit, which could destroy the semiconductor element in question. Alternatively, the semiconductor elements, or at least such elements in certain units, must be designed in most cases to be oversized as regards voltage withstand capability in order to manage such voltage peaks, which makes them unnecessarily expensive.

SUMMARY OF THE INVENTION

The object of the present invention is to provide a method as well as a converter of the kind defined in the introduction, which make it possible to overcome the above-mentioned drawbacks, hence making it possible to ensure that no semiconductor element is destroyed during the switching operations because of voltage peaks without this requiring any oversizing of the semiconductor elements.

This object is achieved according to the invention by the provision of a method of the kind defined in the introduction, in which, when changing between main states via a so-called commutation loop, that is, changing between a connection of the positive pole to the output and the zero state according to the third main state, or changing between a connection of the negative pole to the output and the zero state according to the fourth main state, at least when the current direction would entail a voltage peak on essentially the entire voltage between said positive pole and said negative pole across that of the second or the third unit which does not belong to the commutation loop in those cases where the semiconductor elements which are to be turned on in the coming main state and belong to a said pair of units were to be turned on simultaneously, an extra sequence is carried out in the form of a delayed turn-on of the semiconductor element in one unit of the latter pair relative to the semiconductor element in the other unit of said pair.

Thus, the inventors have realized that said problem with voltage peaks arises when changing between main states via a so-called commutation loop, and that this problem may be solved by the introduction of a delay of the turn-on of the semiconductor element in one unit of a said pair of units relative to the semiconductor element in the other unit of said pair during such commutation. By such a delay, it will be ensured that never essentially more than half the voltage between said positive pole and said negative pole will be applied across the second or third unit. Thus, the semiconductor elements of said units need not be oversized as far as voltage withstand capability relative to the semiconductor elements of other units of the converter is concerned.

According to a preferred embodiment of the invention, said extra sequence is always carried out when changing main states according to a said small commutation loop independently of the current direction at the output. It has been found that the problem of said voltage peaks is due to the current direction during a said commutation, but by making the carrying out of the extra sequence independent of the current direction, the method according to the invention may be simplified considerably and its reliability be increased.

In this connection it has been found that it is advantageous to turn on the semiconductor element in the outer unit, that is, the first or fourth unit, of the respective pair of units with a delay relative to the other unit, that is, the sixth or fifth one, in the pair.

According to another preferred embodiment of the invention, said delay is smaller than one-tenth, preferably smaller than one-hundredth, of the normal duration of a said main state. Thus, the point is that the intermediate state that is achieved by said delay is to have a duration, relative to the main states, which in this context is exceedingly short and therefore, in practice, does not influence the result of the operation of the converter otherwise than by avoiding voltage peaks across the semiconductor elements in question.

According to another preferred embodiment of the invention, the semiconductor elements of the units are controlled such that, between two main states, a so-called blanking state is always achieved to avoid that semiconductor elements which are not allowed to be turned on simultaneously should be briefly turned on, at least partly, and that during this state such a semiconductor element can be turned off before another element is thereafter turned on. In this way, partial short circuits of the converter in question can be avoided, for example short circuits of capacitors used on the dc-voltage side of the converter to define the dc voltage.

According to a further preferred embodiment of the invention, the semiconductor elements are controlled to minimize the duration of states lying between said main states, with the semiconductor elements in the second and sixth units simultaneously being turned on or those in the third and fifth units being simultaneously turned on to avoid parallel currents in the converter. The reason is that it has been found that parallel currents associated with undefined operating states of the converter in dependence on the current direction at the output of the converter may be achieved if the semiconductor elements in the second and sixth units or those in the third and fifth units are turned on simultaneously in intermediate states lying between the main states. The problem with such parallel currents and undefined operating states of the converter is solved by making these intermediate states as short as is at all possible.

According to still another preferred embodiment, when changing between main states via a large commutation loop, that is, when changing between the first main state and the fourth main state or changing between the second main state and the third main state, the semiconductor elements belonging to the same pair of units are controlled with one and the same control pulse so that both elements during the change can be held in the same position, turned off or turned on. It has been found that, independently of the direction of the current at the output of the converter, no problems with said voltage peaks arise during commutation according to the so-called large commutation loop, such that the method may be simplified in such a case by using one and the same control pulse for the semiconductor elements belonging to the same pair.

According to yet another preferred embodiment of the invention, the method is carried out on a converter with several said semiconductor elements connected in series in each said unit, and the semiconductor elements belonging to the same unit are controlled by one and the same control pulse. The method according to the invention is especially well suited for converters in which a series connection of a plurality of semiconductor elements is required in order for them to maintain the voltage that the unit must maintain in its blocking state, since in such a case certain semiconductor elements may already have a somewhat higher voltage across them than other semiconductor elements because of certain minor differences between the semiconductor elements, and in such a case it is extremely important that said voltage peaks can be avoided to eliminate the risk of these very semiconductor elements being destroyed and hence also the other semiconductor elements being destroyed.

The invention also relates to a converter according to the accompanying independent converter claims, and the advantages of such a converter in relation to prior art converters of that kind should be completely clear from the description above of the method according to the invention and the preferred embodiments thereof.

The invention also relates to a computer program and to a computer-readable medium according to the corresponding claims. It is readily realized that the method according to the invention as defined in the accompanying set of method claims is well suited to be carried out by program instructions from a processor which is influenced by a computer program provided with the relevant program steps.

Additional advantages and advantageous features of the invention will become clear from the following description and the other dependent claims.

BRIEF DESCRIPTION OF THE DRAWINGS

Preferred embodiments of the invention, mentioned as examples, will be described below with reference to the accompanying drawings, wherein:

FIG. 3 is a simplified block diagram illustrating the principle of controlling a converter according to FIG. 1 according to the present invention.

DETAILED DESCRIPTION OF PREFERRED EMBODIMENTS OF THE INVENTION

Figure 1:
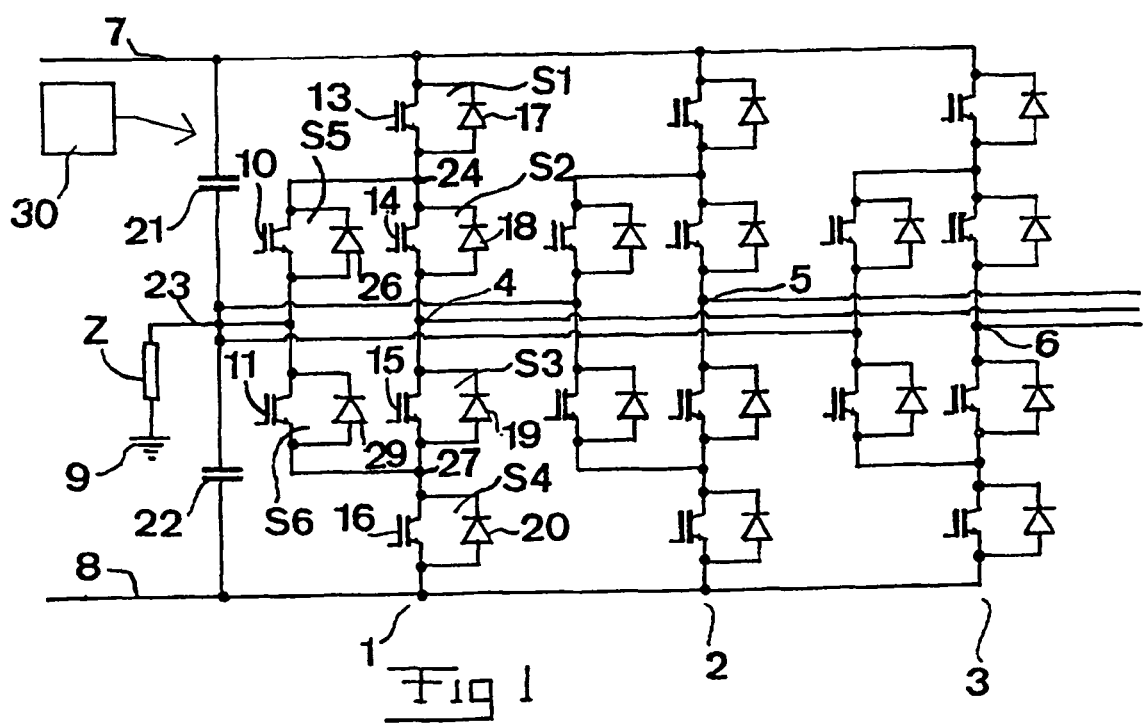
FIG. 1 schematically illustrates a converter of three-level type of the kind to which the method according to the invention may be applied, FIG. 2 schematically illustrates how a pulse-width modulation pattern is placed on the phase output of a converter according to FIG. 1.

FIG. 1 illustrates the composition of a three-level converter of the kind described in the above-mentioned Swedish patent 517 427. It is illustrated here how the converter exhibits three so-called phase legs 1–3, each having a phase output 4–6 for connection of the ac-voltage side of the converter via a reactor and/or transformer to a three-phase ac-voltage network, but hereinafter only one of these phase legs will be discussed. It is also fully possible for the converter to be connected to a single-phase ac-voltage network or the ac-voltage side may be connected, besides to the ac network, to a generator or a motor. The converter is a so-called VSC converter that exhibits a series connection of four units S1–S4, arranged between two poles, one positive 7 and one negative 8, of a dc-voltage side of the converter, said units each comprising a gate turn-off semiconductor element 13–16 and a diode 17–20 connected in anti-parallel therewith and being given orders according to the order in the series connection from the positive to the negative pole.

Two series-connected capacitors 21, 22 are arranged between said two poles, and a point 23 (the centre of the dc-voltage side) between these (which is normally the case) is connected to ground 9 via an impedance Z, whereby this impedance may vary from zero (=direct grounding of the centre of the dc-voltage side) to a value X (=impedance grounding of the centre of the dc-voltage side, via e.g. a resistance R or an inductance L) up to a value $X_{max}$ (=non-grounded centre, where the grounding is only determined by stray capacitances between the centre of the dc-voltage side and ground), so that in this way the potentials +U/2 and −U/2, respectively, are provided at each respective pole, whereby U is the voltage between the two poles 7, 8.

A second centre 24 of the series connection between the first and second units is connected, via a fifth unit S5 with the diode 26 with a conducting direction with respect to the phase output 4 opposite to the conducting direction of the diode of the second unit and a gate turn-off semiconductor element 10 connected in anti-parallel therewith, to the centre of the dc-voltage side, and a third centre 27 of the series connection between the third and fourth units is connected, via a sixth said unit S6 with the diode 29 with a conducting direction with respect to the phase output opposite to the diode of the third unit and a gate turn-off semiconductor element 11 connected in anti-parallel therewith, to the centre of the dc-voltage side.

The gate turn-off semiconductor elements of the units S1–S6 may, for example, be IGBTs or GTOs. Although only one IGBT or GTO per unit has been shown, this may represent a plurality of series-connected, simultaneously controlled IGBTs or GTOs, which is also normally the case, since a relatively large number of such semiconductor elements is required to maintain the voltage that each unit has to maintain in the blocked state when, for example, the dc-voltage side has a voltage exceeding 10 kV. Also, each shown diode, so-called freewheeling diode, may represent a large number of series-connected diodes.

The semiconductor elements included in the converter are controlled via a schematically indicated device 30 to turn on and off to alternately connect the centre, the positive pole and the negative pole of the dc-voltage side to the phase output of the respective phase leg for generating a train of pulses with definite amplitudes and according to a pulse-width modulation pattern (PWM) on the phase output. In this context, the pulse-width modulation frequency is considerably higher, advantageously at least five times higher, more preferred at least 10 times higher and most preferred at least 20 times higher, than the fundamental frequency of the normally essentially sinusoidal alternating current on the phase output of the converter. Thus, the pulse-width modulation frequency may preferably be in the order of magnitude of 1–2 Khz, whereas the fundamental frequency, that is, the frequency of the fundamental tone of the phase current on the phase output, is typically 50 Hz or 60 Hz. In case of a generator-connected or a motor-connected converter, however, the frequency of the current may vary within a large range.

The converter may be operated in different ways, such as for transmission of active power as a rectifier or an inverter, or for transmission of reactive power, or for transmission of a combination of active and reactive power.

The centre 23 of the dc-voltage side is connectible to the phase output 4 by two different so-called zero states, namely, a first one in which the second S2 and the fifth S5 unit are in a conducting state, and a second one, in which the third S3 and the sixth S6 unit are in a conducting state. This possibility of choosing zero states is advantageously utilized for controlling the converter so that the sum of the switching and on-state losses is distributed more uniformly between the semiconductor elements of four of the six units, and how such a control may take place is described in greater detail in Swedish patent 517 427.

The device 30 is advantageously arranged to control the semiconductor elements of the units so that the two zero states are assumed essentially the same number of times per unit of time, and in this context it is advantageous to control the semiconductor elements such that essentially each time a said zero state is to be chosen, that zero state is chosen which is opposite to the zero state which, with respect to time, immediately precedes it.

The control device 30 is designed to control the semiconductor elements of the units S1–S6 to be turned on and off so that alternately four main states are obtained in the converter in the form of a connection of the output to the positive pole of the first side according to a first one, in which thus at least the semiconductor elements of S1 and S2 must be turned on, to the negative pole according to second one, in which at least the semiconductor elements of S3 and S4 must be turned on, or the centre via any of said two zero states. As in the case of the control method according to Swedish patent 517 427, in the method according to the invention an interlock is made between the pairs of units S1, S6 and S4, S5 with regard to their position in the respective main state, so that the elements belonging to the same pairs are simultaneously turned on or off. In this context, it is ensured that the semiconductor elements of the opposite units have turn-off signals before the semiconductor element to be turned on has a turn-on signal. If no such interlock should be present and, for example, S1, S6 be turned on before S4, S5 are turned off when changing from the fourth to the first state, then the capacitors 21 and 22 will be briefly short-circuited and large short circuit currents arise.

Figure 2:
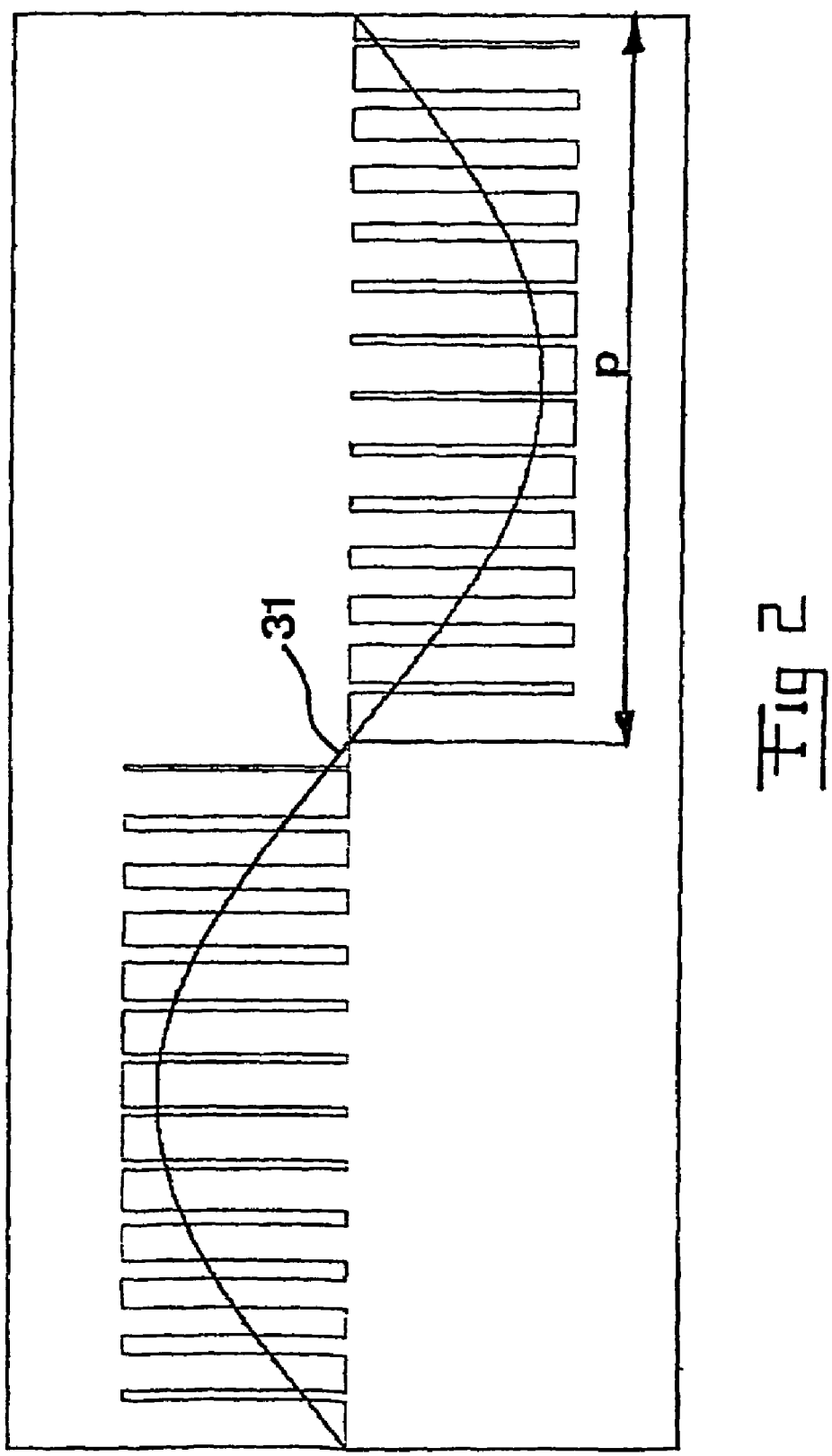

FIG. 2 illustrates what a pulse-width modulation pattern may typically look like for a converter of the kind shown in FIG. 1. Here, the shown sine curve 31 is the voltage reference value of the phase output 4 of the converter, whereas it is clear that when said reference value is positive, the positive pole and the centre 23 of the dc-voltage side are alternately connected to the phase output, that is, positive pulses and zero pulses while a shifting width is being changed, whereas when said reference value is negative, a change between negative pulses and zero pulses is made.

FIG. 3 illustrates very schematically how the control by means of the control device 30 is carried out in practice. A reference value corresponding to the voltage reference value of the phase output arrives at 33 at a pulse-width modulation generator 34, which prepares the pulse-width modulation pattern shown in FIG. 2 and sends a pulse-width modulation signal on its output 35, which orders a positive, a negative or a zero pulse on the phase output, to a zero-stage selector 36, which sends a pulse-width modulation signal containing information on which zero state to be chosen when a zero pulse is to be placed on the phase output, to a means 37 for controlling the semiconductor elements of the different units S1–S6 to be turned on or off, which is illustrates by the six arrows 38 to the semiconductor elements.

The inventors of the present invention have realized that at certain commutations between different main states in a method according to Swedish patent 517 427, brief voltage peaks on essentially the whole voltage U between the two poles of the dc-voltage side will be applied across any of the two inner units, that is, S2 or S3. This results in a considerable risk of failure of one or several semiconductor elements in such a unit, unless the units are greatly over-sized as far as voltage withstand capability is concerned, which is costly. More particularly, this problem arises when changing between main states via a so-called small commutation loop, that is, between the connection of the positive pole to the output and the third zero state or the connection of the negative pole to the output and the fourth zero state. This is due to the units behaving differently depending on whether it is a question of a passive voltage switching of the semiconductor elements or whether it is a question of an actual current commutation. This can be exemplified by changing between the first main state, in which S1, S2 and S6 are turned on, and the third main state, in which S2, S5 and S4 are turned on. If in such a case, after turning off S1 and S6, S4 and S5 were to be turned on simultaneously, then, because S1 has carried current, it would take quite a substantial amount of time to turn on the semi-conductor element in S5 and commutate the current over from S1 to that element, so that briefly the output 4 would still have the same potential as the positive pole of the dc-voltage side. If, on the other hand, the semiconductor element in S4 were to turn on simultaneously, which would involve a passive voltage switching without any current commutation, then the potential of the negative pole would be connected considerably faster to point 27 between S3 and S4, so that the whole voltage between the two dc-voltage poles would briefly lie across S3. However, the invention solves this problem by the introduction, when changing between main states via a small commutation loop, of an extra sequence in the form of a delayed turn-on of the semiconductor element in one unit of that pair which is to be turned on relative to the semiconductor element in the other unit of said pair. In the example just described, this implies that the semiconductor element in S4 is turned on with a delay relative to the semiconductor element in S5, so that said current commutation has had time to occur and the phase output 4 is at zero potential before the semiconductor element in S4 is turned on, and hence only half the dc voltage will be applied across S3. This delay is then very short in relation to the normal duration of a said main state, and the ratio is typically such that the delay is smaller than one-tenth, preferably smaller than one-hundredth, of the normal duration of a said main state, and may, for example, be 5 μs/1000 μs.

In addition to these so-called extra sequences during a so-called small commutation loop, the semiconductor elements of the units are controlled such that, between two main states, there is always a so-called blanking state to avoid that semiconductor elements which are not allowed to be turned on simultaneously should briefly be so, at least partly, and that during this state such a semiconductor element has time to turn off before another such element is thereafter turned on. Such blanking states have a duration of approximately the same order of magnitude as said delay and are thus exceedingly short in relation to the normal duration of a main state. They are introduced between all main states, also during so-called large commutation loops when a said extra sequence is not carried out.

In addition, the semiconductor elements are controlled to minimize the duration of states, lying between said main states, with the semiconductor elements in the second and sixth units being simultaneously turned on or those in the third and fifth units being simultaneously turned on to avoid parallel currents in the converter.

This leads to the following control schemes for changing between main states via a so-called commutation loop according to the present invention:

Tables 1–4 show the methods according to the invention with extra sequences during a change between main states via a so-called small commutation loop, wherein B indicates a blanking state and E an extra sequence. In a corresponding manner, changing between main states via the two so-called commutations loops is summarized in table 5 and table 6. There, it is clear that no extra sequences are used.

TABLE 1

|    | S1 | S2 | S3 | S4 | S5 | S6 |
|----|----|----|----|----|----|----|
| 1+ | 1  | 1  | 0  | 0  | 0  | 1  |
| B  | 0  | 1  | 0  | 0  | 0  | 0  |
| E  | 0  | 1  | 0  | 0  | 1  | 0  |
| 3N | 0  | 1  | 0  | 1  | 1  | 0  |

TABLE 2

|    | S1 | S2 | S3 | S4 | S5 | S6 |
|----|----|----|----|----|----|----|
| 3N | 0  | 1  | 0  | 1  | 1  | 0  |
| E  | 0  | 1  | 0  | 0  | 1  | 0  |
| E  | 0  | 1  | 0  | 0  | 1  | 1  |
| B  | 0  | 1  | 0  | 0  | 0  | 1  |
| 1+ | 1  | 1  | 0  | 0  | 0  | 1  |

TABLE 3

|    | S1 | S2 | S3 | S4 | S5 | S6 |
|----|----|----|----|----|----|----|
| 2− | 0  | 0  | 1  | 1  | 1  | 0  |
| B  | 0  | 0  | 1  | 0  | 0  | 0  |
| E  | 0  | 0  | 1  | 0  | 0  | 1  |
| 4N | 1  | 0  | 1  | 0  | 0  | 1  |

TABLE 4

|    | S1 | S2 | S3 | S4 | S5 | S6 |
|----|----|----|----|----|----|----|
| 4N | 1  | 0  | 1  | 0  | 0  | 1  |
| E  | 0  | 0  | 1  | 0  | 0  | 1  |
| E  | 0  | 0  | 1  | 0  | 1  | 1  |

TABLE 4-continued

|   | S1 | S2 | S3 | S4 | S5 | S6 |
|---|----|----|----|----|----|----|
| B | 0 | 0 | 1 | 0 | 1 | 0 |
| 2− | 0 | 0 | 1 | 1 | 1 | 0 |

TABLE 5

|   | S1 | S2 | S3 | S4 | S5 | S6 |
|---|----|----|----|----|----|----|
| 1+ | 1 | 1 | 0 | 0 | 0 | 1 |
| B  | 1 | 0 | 0 | 0 | 0 | 1 |
| 4N | 1 | 0 | 1 | 0 | 0 | 1 |
| B  | 1 | 0 | 0 | 0 | 0 | 1 |
| 1+ | 1 | 1 | 0 | 0 | 0 | 1 |

TABLE 6

|   | S1 | S2 | S3 | S4 | S5 | S6 |
|---|----|----|----|----|----|----|
| 2− | 0 | 0 | 1 | 1 | 1 | 0 |
| B  | 0 | 0 | 0 | 1 | 1 | 0 |
| 3N | 0 | 1 | 0 | 1 | 1 | 0 |
| B  | 0 | 0 | 0 | 1 | 1 | 0 |
| 2− | 0 | 0 | 1 | 1 | 1 | 0 |

The change according to table 1 has already been commutated higher up. The change according to table 2 may be explained as follows. The intermediate state with S2 and S5 being conducting is introduced before the second intermediate state with S2, S5 and S6 being conducting, since otherwise there is a risk of S4 and S6 being briefly simultaneously turned on and short-circuiting the capacitor 22. The extra sequence in the form of the state with S2, S5 and S6 being turned on is there to force the centre 27 between S3 and S4 to become zero before the phase output is connected to the positive pole. The blanking state with S2 and S6 being turned on is important since otherwise it would have been necessary to turn off S5 simultaneously with turning on S1, and for the reason stated above it is not desired to control the semiconductor elements in two units in a small commutation loop simultaneously.

Tables 3 and 4 need no further explanation, since the same problems arise there as when changing according to table 1 and table 2 and these changes are mirror-symmetrical relative to the output 4 and the centre 23 relative to the former.

As already mentioned above, the states with S3 S5 S6, S3 S5, S2 S5 S6 or S2 S6 being simultaneously conducting are to be minimized to limit the duration of parallel currents in the circuit as far as possible.

To simplify the control method according to the invention, this is not done depending on the direction of the current at the output 4, although certain problems that are solved by said extra sequences only occur at a given current direction and, at an opposite current direction, the extra sequence thus could be omitted. However, this would lead to a considerably more complicated control method.

The invention is not, of course, in any way limited to the preferred embodiments described above, but a number of possibilities of modifications thereof should be obvious to a person skilled in the art without this person deviating from the fundamental concept of the invention as defined in the claims.

A number of other possibilities of control schemes utilizing the fundamental concept of the invention should be obvious. to persons skilled in the art.

For example, it is fully possible to sense the direction of the current at the output and to make the performance of an extra sequence or not dependent on the current direction. It is also possible for the converter in question to exhibit additional said units to provide possibilities for more than three levels on the output.

The invention claimed is:

1. A method for control of a converter for conversion of dc voltage into ac voltage or dc voltage and vice versa, comprising a series connection of four units, arranged between two poles, one positive pole and one negative pole, of a first side in the form of a dc-voltage side of the converter, each of said units comprising a gate turn-off semiconductor element and a diode connected in antiparallel therewith and being given orders according to the order in the series connection from the positive to the negative pole, a line on the second side of the converter being connected to a first center, designated output, of the series connection between the second and third units, means arranged to provide, on said first side, a center between the two poles and to place these poles at the same voltage but with opposite signs in relation to the center of the first side, wherein a second center of the series connection between the first and second units is connected, via a fifth said unit with a gate turn-off semiconductor element and with the diode connected in antiparallel therewith with the conducting direction with respect to the output opposite to the conducting direction of the diode of the second unit, to the center of the first side, and a third center of the series connection between the third and fourth units is connected, via a sixth said unit with a gate turn-off semiconductor element and with the diode connected in antiparallel therewith with a conducting direction with respect to the output opposite to the diode of the third unit, to the center of the first side, wherein the semiconductor elements of the units are controlled to be turned on and off such that alternately four main states are obtained in the converter in the form of a connection of the output to the positive pole of the first side according to a first, to the negative pole according to a second, or the center via any of two different so-called zero states, namely, a third, in which the second and fifth units are in a conducting state, and a fourth, in which the third and sixth units are in a conducting state, wherein the first and sixth units form a pair in that said semiconductor elements are controlled to assume, in the respective main state, the same position, turned on or off, and the fourth and fifth units form a pair in that these semiconductor elements are controlled to assume, in the respective main state, the same position, turned on or off, and wherein a change between the first and second main states is always made via the third or fourth zero state, wherein when changing between main states via a so-called small commutation loop, that is, changing between a connection of the positive pole to the output and the zero state according to the third main state, or changing between a connection of the negative pole to the output and the zero state according to the fourth main state, at least when the current direction would entail a voltage peak on essentially the entire voltage between said positive pole and said negative pole across that of the second or the third unit which does not belong to the commutation loop in those cases where the semiconductor elements which are to be turned on in the coming, main state and belong to a said pair of units were to be turned on simultaneously, an extra sequence is carried out in the form of a delayed turn-on of the semiconductor element in one unit of the latter pair relative to the semiconductor element in the other unit of said pair.

2. The method according to claim 1, wherein said extra sequence is always carried out when changing main states according to a said small commutation loop independently of the current direction at the output.

3. The method according to claim 1, wherein it is the semiconductor element in the outer unit, that is, the first or fourth unit, of the respective pair of units that is turned on with a delay relative to the other unit, that is, the sixth or fifth, in the pair.

4. The method according to claim 1, wherein when changing from the first to the third main state, the semiconductor element in the fourth unit is turned on with a delay relative to the semiconductor element in the fifth unit.

5. The method according to claim 1, wherein when changing from the second to the fourth main state, the semiconductor element in the first unit is turned on with a delay relative to the semiconductor element in the sixth unit.

6. The method according to claim 1, wherein when changing from the third to the first main state, the semiconductor element in the first unit is turned on with a delay relative to the semiconductor element in the sixth unit.

7. The method according to claim 1, wherein when changing from the fourth to the second main state, the semiconductor element in the fourth unit is turned on with a delay relative to the semiconductor element in the fifth unit.

8. The method according to claim 1, wherein said delay is smaller than one tenth, preferably smaller than one-hundredth, of the normal duration of a said main state.

9. The method according to claim 1, wherein the semiconductor elements of the units are controlled such that, between two main states, a so-called blanking state is always achieved to avoid that semiconductor elements that are not allowed to be turned on simultaneously should briefly be so, at least partly, and that, during this state, such a semiconductor element has time to turn off before another such element is thereafter turned on.

10. The method according to claim 9, wherein the semiconductor elements are controlled to assume said blanking state for a period of time that lasts less than one-tenth, preferably less than one-hundredth, of the normal duration of a said main state.

11. The method according to claim 1, wherein the first main state is achieved by controlling the semiconductor elements in the first, second and sixth units to be turned on, the second main state by controlling the semiconductor elements in the third, fourth and fifth units to be turned on, the third main state by controlling the semiconductor elements in the second, fourth and fifth units to be turned on, and the fourth main state by controlling the semiconductor elements in the first, third and sixth units to be turned on.

12. The method according to claim 11, wherein when changing from the first main state to the third main state, the semiconductor elements in the first and sixth states are first turned off, then the semiconductor element in the fifth unit is turned on, and finally the semiconductor element in the fourth unit is turned on.

13. The method according to claim 11, wherein when changing from the third main state to the first main state, the semiconductor element in the fourth unit is fist turned off, then the semiconductor element in the sixth unit unit is turned on, whereupon the semiconductor element in the fifth unit is turned off, and, finally, the semiconductor element in the first unit is turned on.

14. The method according to claim 11, wherein when changing from the second main state to the fourth main state, the semiconductor elements in the fourth and fifth units are fist turned off, then the semiconductor element in the sixth unit unit is turned on, and, finally, the semiconductor element in the first unit is turned on.

15. The method according to claim 11, wherein when changing from the fourth main state to the second main state, the semiconductor element in the first unit is fist turned off, then the semiconductor element in the fifth unit unit is turned on, whereupon the semiconductor element in the sixth unit is turned off, and, finally, the semiconductor element in the fourth unit is turned on.

16. The method according to claim 1, wherein the semiconductor elements are controlled to minimize the duration of states, lying between said main states, with the semiconductor elements in the second and sixth units being simultaneously turned on, or those in the third and fifth units being simultaneously turned on to avoid parallel currents in the converter.

17. The method according to claim 1, wherein when changing between main states via a large commutation loop, that is, when changing between the first main state and the fourth main state or when changing between the second main state and the third main state, the semiconductor elements belonging to the same pair of units are controlled with one and the same control pulse to be both maintained constantly in the same position, turned off or on, during the changing.

18. The method according to claim 1, wherein the semiconductor elements of the units are controlled such that the two zero states are assumed essentially the same number of times per unit of time.

19. The method according to claim 18, characterized in that wherein the semiconductor elements of the units are controlled such that essentially each time a said zero state is to be chosen, that zero state is chosen which is opposite to the zero state which, with respect to time, immediately precedes it.

20. The method according to claim 1, wherein it is carried out on a converter with several said semiconductor elements connected in series in each said unit, and that the semiconductor elements belonging to the same unit are controlled by one and the same control pulse.

21. The method according to claim 1, wherein it is semiconductor element in the form of Insulated Gate Bipolar Transistors that are controlled to be turned on and off.

22. The method according to claim 1, wherein it is carried out on a converter in the form of a VSC converter for conversion of ac voltage into dc voltage and vice versa, with said line formed from an ac-voltage phase conductor for generating, by changing between the main states, a train of pulses with definite amplitudes according to a pulse-width modulation pattern on the output of the converter.

23. The method according to claim 22, wherein it is a VSC converter with a dc-voltage side formed from a dc-voltage network for transmission of high-voltage direct current and the ac-voltage phase conductor belonging to an ac-voltage network that is controlled.

24. The method according to claim 22, wherein it is two VSC converters of a back-to-back station with their ac-voltage sides connected to one and the same, or to separate, ac-voltage networks and their dc-voltage sides connected to each other that are controlled.

25. The method according to claim 22, wherein it is a VSC converter included in an Static Var Compensator with the dc-voltage side formed from freely hanging capacitors and the ac-voltage phase conductor belonging to an ac-voltage network that is controlled.

26. The method according to claim 1, wherein it is a VSC converter with said output connected to an ac motor that is controlled.

27. The method according to claim 1, wherein it is a VSC converter with said output connected to an ac generator that is controlled.

28. A converter for conversion of dc voltage into ac voltage or dc voltage and vice versa, comprising a series connection of four units, arranged between two poles, one positive pole and one negative pole, of a first side in the form of a dc-voltage side of the converter, each of said units comprising a gate turn-off semiconductor element and a diode connected in antiparallel therewith and being given orders according to the order in the series connection from the positive to the negative pole, a line on the second side of the converter being connected to a first center, designated output, of the series connection between the second and third units, means arranged to provide, on said first side, a center between the two poles and to place these poles at the same voltage but with opposite signs in relation to the center of the first side, wherein a second center of the series connection between the first and second units is connected, via a fifth said unit with a gate turn-off semiconductor element and with the diode connected in antiparallel therewith with the conducting direction with respect to the output opposite to the conducting direction of the diode of the second unit, to the center of the first side, and a third center of the series connection between the third and fourth units is connected, via a sixth said unit with a gate turn-off semiconductor element and with the diode connected in antiparallel therewith with a conducting direction with respect to the output opposite to the diode of the third unit, to the center of the first side, wherein the converter also comprises a device arranged to control the semiconductor elements of the units to be turned on and off to alternately achieve four main states of the converter in the form of a connection of the output to the positive pole of the first side according to a first, to the negative pole according to a second or to the center via any of two different so-called zero states, namely a third, in which the second and fifth units are in a conducting state, and a fourth, in which the third and sixth units are in a conducting state, wherein the first and sixth units form a pair in that the device is arranged to control the semiconductor elements thereof to assume, in the respective main state, the same position, turned on or off, and the fourth and fifth units form a pair in that the device is arranged to control the semiconductor elements thereof to assume, in the respective main state, the same position, turned on or off, and wherein the device is arranged to control the semiconductor elements such that a change between the first and second main states is always made via the third or fourth zero state, wherein the device is arranged, when changing between main states via a so-called small commutation loop, that is, changing between a connection of the positive pole to the output and the zero state according to the third main state, or a connection of the negative pole to the output and the zero state according to the fourth main state, at least when the current direction would entail a voltage peak on essentially the entire voltage between said positive pole and said negative pole across that of the second or the third unit which does not belong to the commutation loop in those cases where the semiconductor elements which are to be turned on in the coming main state and belong to a said pair of units were to be turned on simultaneously, to control these semiconductor elements according to an extra sequence in the form of a delayed turn-on of the semiconductor element in one unit of the latter pair relative to the semiconductor element in the other unit of said pair.

29. A computer program which is loadable directly into the internal memory of a computer, said computer program comprising software code portions for controlling the steps of claim 1, when running the program on the computer.

30. The computer program according to claim 29, provided at least partly via a network such as the Internet.

31. A computer-readable medium with a program registered thereon, wherein the program is designed to bring a computer to control the steps according to claim 1.

* * * * *